Oct. 27, 1931.  J. W. SCHADE  1,829,018
VULCANIZING METHOD AND APPARATUS
Filed May 20, 1929  3 Sheets-Sheet 2
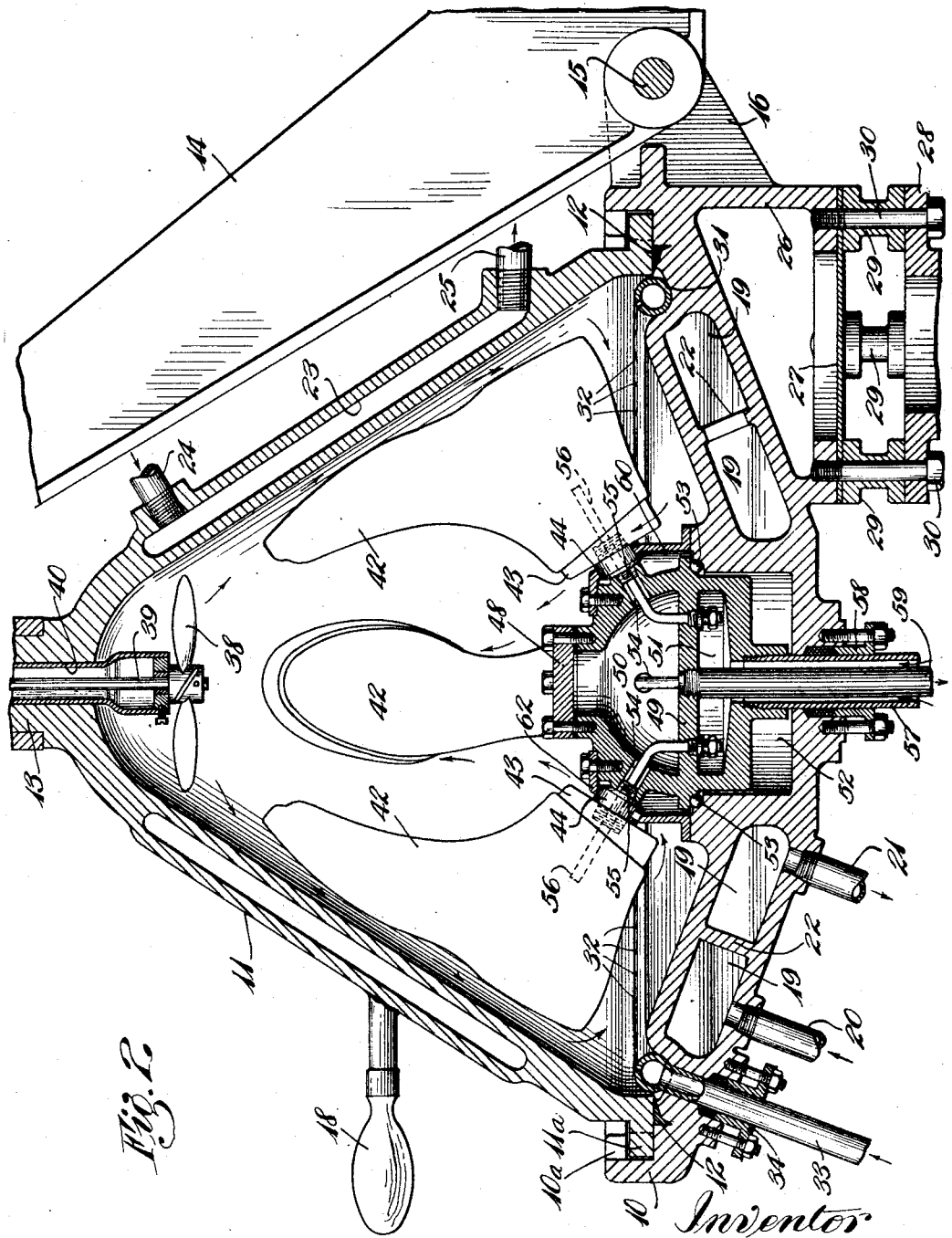

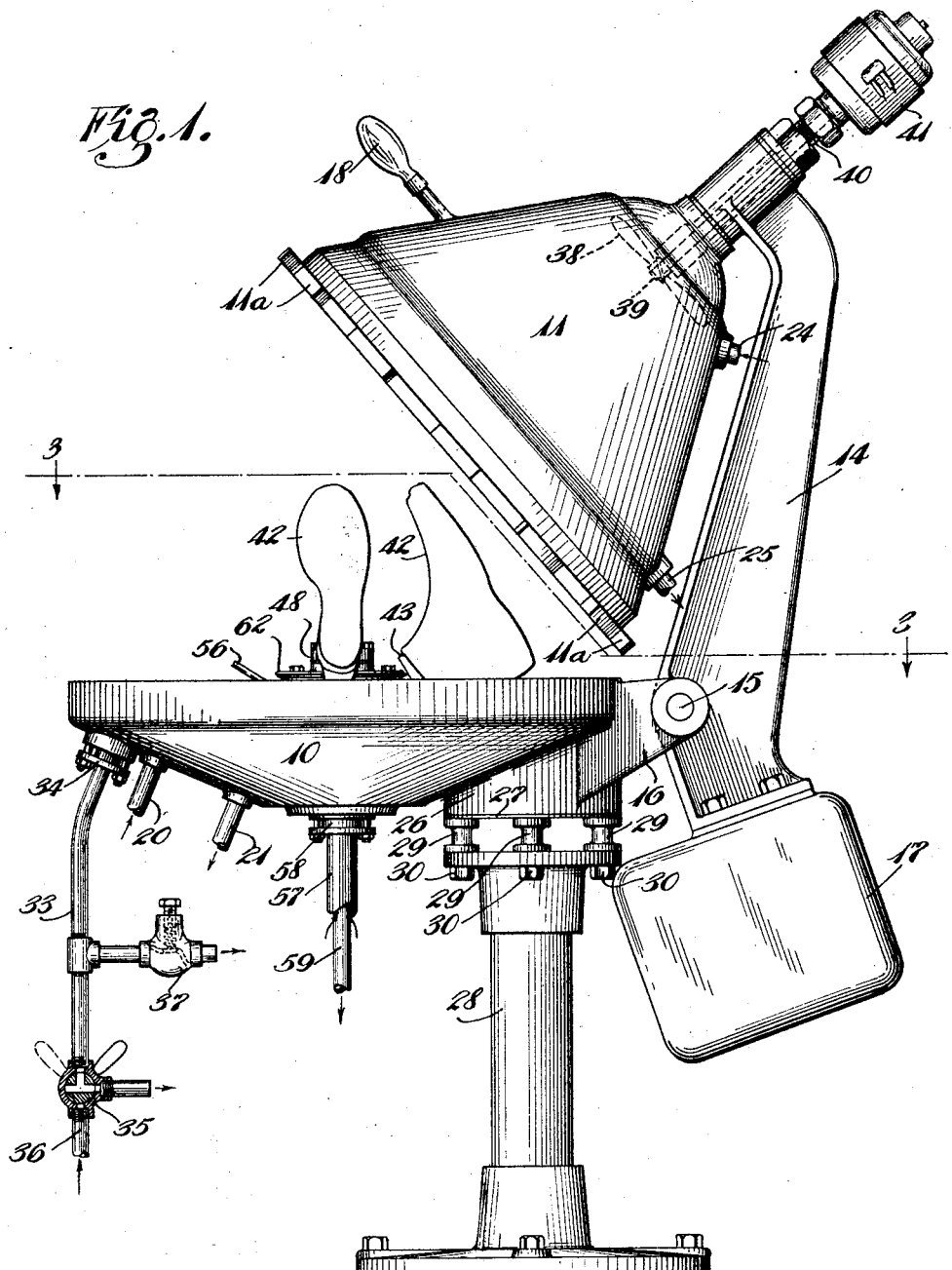

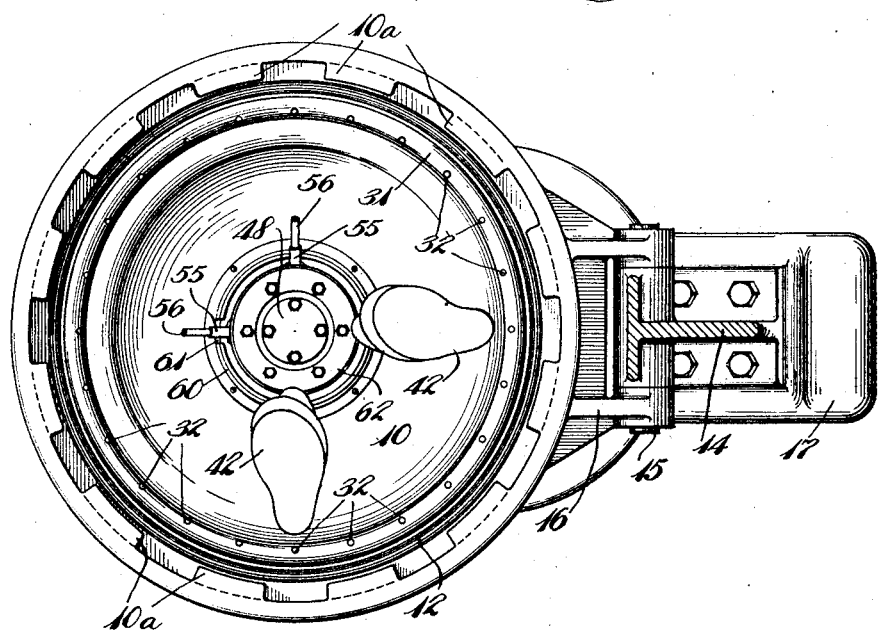

Patented Oct. 27, 1931

1,829,018

UNITED STATES PATENT OFFICE

JAMES W. SCHADE, OF AKRON, OHIO, ASSIGNOR TO THE B. F. GOODRICH COMPANY, OF NEW YORK, N. Y., A CORPORATION OF NEW YORK

VULCANIZING METHOD AND APPARATUS

Application filed May 20, 1929. Serial No. 364,428.

This invention relates to vulcanizing methods and apparatus, and more especially to procedure and apparatus for vulcanizing footwear.

The invention is of especial advantage for vulcanizing those types of footwear which it has been found impractical to vulcanize in open steam, and which consequently heretofore have required relatively long periods of time for vulcanization, usually approximately two hours or more, in hot air.

The chief objects of my invention are to provide an improved method of vulcanizing footwear or the like whereby the vulcanizing period may be shortened; and to provide simple and efficient apparatus for practicing the method. A further object is to effect a rapid turnover of the lasts on which the footwear is vulcanized.

The vulcanizer which I employ preferably is of relatively small size as compared with the usual type employed for vulcanizing footwear in open heat without molding pressure. The vulcanizer preferably accommodates about six or eight articles of footwear, and I provide a series of such vulcanizers to be attended by one operator, and arrange the vulcanizing intervals so that the operator is continuously employed removing and mounting articles in successive vulcanizers of the series. In this manner I provide a continuous flow of articles to and from the vulcanizers and provide a more rapid turnover of the shoe lasts than is possible by the use of large vulcanizers wherein hundreds of pieces of footwear are vulcanized at one time. The arrangement provides for economy of lasts and provides other advantages incident to operating with small units.

Of the accompanying drawings:

Fig. 1 is a side elevation of apparatus embodying and adapted to carry out my invention in its preferred form, and the work therein, the cover of the apparatus being open.

Fig. 2 is a vertical section through the apparatus shown in Fig. 1, parts being broken away and the cover being in closed position.

Fig. 3 is a plan view of the apparatus on line 3—3 of Fig. 1.

Fig. 4 is a sectional detail on a larger scale of a last-supporting structure.

Referring to the drawings, my improved vulcanizer comprises a dished base member 10 and a substantially conical cover 11, which members have their respective marginal portions formed with breech-block lugs $10^a$, $11^a$ adapted to interlock with each other. A flexible lip gasket 12 of rubber is mounted between the member 10 and cover 11 to seal the vulcanizer when the cover is closed. The cover 11 is provided exteriorly with an axial stem 13 (Fig. 2) which is swiveled in one end of an arm 14 pivotally mounted at 15 on a bracket 16 formed on the base member 10, the other end of said arm being provided with a counterweight 17 to facilitate raising and lowering of the cover 11. A handle 18 extends radially from the cover 11 for turning the same angularly to interlock or release the lugs $10^a$, $11^a$ from each other.

The base member 10 is formed with a steam-chamber 19 in its wall and is provided with respective steam inlet and steam outlet pipes 20, 21, a suitable baffle 22 being formed in the steam-chamber 19 to insure complete circulation of the steam through the chamber. The cover 11 is formed with a steam-chamber 23 in its wall and is provided with respective steam inlet and steam outlet pipes 24, 25 which preferably are flexible to permit raising and lowering of the cover.

The base member is formed adjacent the bracket 16 with a downwardly extending annular flange 26, providing a dead air chamber which is closed by a plate 27. The flange 26 provides a suitable attaching structure for the mounting of the base member 10 upon a supporting pedestal 28, a plurality of grooved spacer members 29, 29 being interposed between the member 10 and the pedestal, and attaching bolts 30, 30 extending through said spacer blocks. The arrangement is such that very little heat is lost from the base member 10 by conduction into the pedestal 28.

Mounted in a concentric groove in the upper face of the base member 10 is an annular pipe 31, having its wall formed with a circumferential series of upwardly directed ports or apertures 32, 32. An inlet pipe 33 is connected to the pipe 31 and extends through the wall of the base member 10, a stuffing box 34 being provided to prevent the escape of fluid between the pipe 33 and the wall of the aperture in the member 10 through which the pipe extends. The pipe 33 is connected, through a three-way valve 35, with a supply pipe 36 from a source of gaseous pressure fluid (not shown), and a relief valve 37 is connected with the pipe 33 for automatically controlling the pressure of the fluid in the pipe 33.

For inducing a circulation of the gaseous pressure fluid within the vulcanizer, a blower fan 38 is mounted interiorly of the vulcanizer cover 11 at the apex thereof, the arrangement being such that when the cover is closed and the fan rotated a circulation of the fluid is induced which causes the fluid to move downwardly along the heated wall of the cover, radially over the heated base member 10 toward the axis thereof and then axially upward back to the fan, substantially as indicated by the arrows in Fig. 2. The fan 38 is mounted upon the lower or inner end of a shaft 39 which is suitably journaled in a sleeve member 40 mounted in the stem 13 of the cover 11, the outer end of said shaft being connected with a motor 41 which is mounted upon the outer end of said sleeve.

The footwear to be vulcanized, shown at 42, 42, is mounted in the vulcanizer upon the same lasts 43, 43, on which it is built. The lasts 43 are hollow, and each last has an axially apertured plug 44 threaded into its head portion. Each plug 44 is formed with an annular countersunk recess 45 surrounding its axial aperture, and a double-lip gasket 46 is mounted in the said recess. Exteriorly, the plug 44 is formed with a tangential slot 47 facing the back of the last, for a purpose presently to be explained.

To facilitate the mounting and removal of the lasted shoes 42 from the vulcanizer, I prefer to support them upon a turntable or turret 48 which is manually rotatable to permit the operator to mount and dismount shoes thereon without changing his standing position. The turret 48 comprises a hollow, generally hemispherical structure which is formed interiorly with a partition 49 to provide an upper chamber 50 and a lower chamber 51. The lower portion of the turret has a cylindrical extension which is positioned within a similarly shaped axial recess 52 in the upper side of the base member 10 of the vulcanizer. Ball bearings 53 are suitably mounted between the base member 10 and the turret 48 to facilitate rotation of the latter.

The hemispherical wall of the turret is formed with an annular series of equally spaced radial apertures 54, 54, and tubular stems or sleeves 55, 55 are threaded into respective apertures and extend outwardly and upwardly from the turret. The outside diameter of each stem 55 is such that it slidably fits the bore of a last-plug 44, the stem being adapted to provide support for a last mounted thereon and to provide communication from the hollow interior of the last to the upper chamber 50 of the turret. Tubular pipes or nozzles 56, 56 of smaller size than the stems 55 and apertures 54 are disposed coaxially therein, the free end of each nozzle 56 extending beyond the end of its stem 55 so as to be positioned well within the hollow interior of a last mounted on said stem. The other end of each nozzle 56 is mounted in the partition 49 through which it extends to provide communication between the hollow interior of a last 43 and the lower chamber 51 of the turret.

A pipe 57 extends through the bottom walls of the base member 10 and turret 48 and communicates with the lower chamber 51 of the latter at the axis thereof, and a stuffing box 58 is mounted in the wall of the base member 10 to prevent the escape of pressure fluid between said wall and the pipe 57. The lower end of the pipe 57 is swiveled in a fixture (not shown) which permits the pipe to rotate with the turret 48, and said fixture is connected with a suitable steam supply (not shown). A pipe 59 coaxially mounted within the steam pipe 57, and spaced from the wall thereof extends through the chamber 51 and partition 49 of the turret 48 and communicates with the upper chamber 50 therein, the lower end of the pipe 59 being swiveled within a suitable fixture (not shown) having communication with a steam-trap and drain. The arrangement is such that steam may be conducted concurrently to the several lasts 43 mounted on the rotatable turret, and water of condensation concurrently conducted from said lasts.

I have found that the best results are obtained when the sole portion of the footwear, which portion contains the greatest proportion of rubber, is positioned adjacent to and parallel with a heated member, whereby the sole portions may benefit directly by the heat of radiation as well as of conduction and convection, and for this reason I prefer to position the shoes with their soles adjacent the tapered wall of the cover 11 as shown. This arrangement of the shoes is effected by the angularity of the stems 55 on which the lasts 43 are mounted, the shoes being properly positioned when their toes point upwardly. To prevent angular movement of the lasts 43 with relation to the stems 55 after the lasts are properly positioned thereon, an annular rail or locking ring 60 is mounted upon the base member 10 concentric with the turret 48, the upper marginal portion of said ring being so positioned as to interfit with the tangential slots 47 formed in the respective last-plugs 44. The ring 60 thus prevents angular movement of the lasts upon their supporting stems 55, and also prevents axial movement of the lasts if at any time the pressure of the steam within the lasts exceeds the pressure of the fluid outside the same. The locking ring 60 is cut away at one point 61 to permit mounting and removal of the lasts from the supporting stems 55. An annular plate or keeper 62 secured to the top of the turret 48 has one margin so disposed as to engage the upper side of the last plugs 44 at all times that they are on the turret and thus serves to assist the locking ring 60 in relieving the stems 55 of the weight of the lasts.

In the practice of my invention the base member 10 and cover 11 are constantly heated by steam at about 80 pounds pressure (324°) admitted to their respective chambers 19, 23. Lasts 43 with unvulcanized footwear 42 thereon are mounted upon the respective stems 55 of the turret 48 by rotating the latter to present said stems at the cut-away portion 61 of the locking ring 60. As soon as all the stems 55 are provided with lasts, the cover 11 is closed and locked and gaseous fluid such as air, at room temperature, is admitted to the interior of the vulcanizer through the pipe 33, the valve 37 being set to maintain the air in the vulcanizer substantially at about 55 pounds pressure. Steam at about 50 pounds pressure is admitted through the pipe 57 to the interiors of the lasts 43, and rotation of the fan 38 is started to induce a circulation of the air within the vulcanizer, and said air by passing over the heated surfaces of the base 10 and cover 11 quickly is raised to vulcanizing temperature. Under these conditions, vulcanization of the footwear is effected in the relatively short time of about 15 minutes.

My invention may be modified within the scope of the appended claims, and I do not limit my claims wholly to the exact procedure or specific construction shown and described.

I claim:

1. The method of vulcanizing an article of rubber footwear which comprises applying a relatively high degree of heat to the outer face of the sole thereof as compared to the rest of the article by radiation while maintaining a heating fluid in heating relation to the rest of the article.

2. The method of vulcanizing an article of rubber footwear which comprises applying a relatively high degree of heat to the outer face of the sole thereof as compared to the rest of the article by radiation while circulating a heating fluid in heating relation to the rest of the article.

3. Footwear-vulcanizing apparatus comprising a heat-radiating member, means for supporting an article of footwear with its sole exposed in close proximity to the said heat-radiating member, and means for maintaining a heating fluid in heating relation to the rest of the article.

4. Footwear-vulcanizing apparatus comprising a heat-radiating member, means for supporting an article of footwear with its sole exposed in close proximity to the said heat-radiating member, and means for circulating a heating fluid in heating relation to the rest of the article.

5. Footwear-vulcanizing apparatus comprising a heat-radiating member, means for supporting an article of footwear with its sole exposed and so presented to the said heat-radiating member as to cause the sole to be heated thereby with approximate uniformity throughout the extent of the sole, and means for maintaining a heating fluid in heating relation to the rest of the article with approximate uniformity of heating effect throughout the extent thereof.

6. Footwear-vulcanizing apparatus comprising a vulcanizing chamber, means for circulating a heating fluid in said chamber, means for supporting an article of footwear with its outer surface exposed in said chamber, separate means for heating the article from the interior thereof, and means for applying a relatively high degree of heat to the outer face of the sole of the article, as compared to the rest of the article, by radiation.

7. Footwear-vulcanizing apparatus comprising a vulcanizing chamber, means for circulating a heating fluid in said chamber, means for supporting an article of footwear with its outer surface exposed in said chamber, means for circulating a heating fluid within the article, and means for applying a relatively high degree of heat to the outer face of the sole of the article as compared to other parts of the article.

8. Footwear-vulcanizing apparatus comprising means for supporting an article of footwear with its outer surface exposed, a steam-jacketed hood member adapted to be lowered over an article of footwear mounted on said supporting means to enclose the article and so positioned with relation thereto as to heat the sole portion thereof by radiation, and means for maintaining a heated fluid in said hood.

9. Footwear-vulcanizing apparatus comprising means for supporting an article of footwear with its outer surface exposed, a steam-jacketed hood member adapted to be lowered over an article of footwear mounted on said supporting means to enclose the article and so positioned as to heat the sole portion thereof by radiation, the said hood being hinged and counterbalanced, and sealing means interposed between the hinged hood and the supporting means.

10. Footwear-vulcanizing apparatus comprising means for supporting an article of footwear in an accessible, projecting condition with its outer surface exposed, a steam jacketed container adapted to mate with said supporting means to enclose the article and so arranged as to heat the sole portion thereof by radiation, and means for maintaining fluid in said container in a heated condition.

11. Footwear-vulcanizing apparatus comprising means for supporting an article of footwear in an accessible, projecting condition with its outer surface exposed, a steam-jacketed container adapted to mate with said supporting means to enclose the article and so constructed and arranged as to heat the sole portion thereof by radiation, means for maintaining fluid in said container in a heated condition, and separate means for heating the article from the interior thereof.

In witness whereof I have hereunto set my hand this 17th day of May, 1929.

JAMES W. SCHADE.